United States Patent
Leonard et al.

(10) Patent No.: US 11,093,630 B2
(45) Date of Patent: Aug. 17, 2021

(54) DETERMINING VIEWABLE SCREEN CONTENT

(71) Applicant: INTERNATIONAL BUSINESS MACHINES CORPORATION, Armonk, NY (US)

(72) Inventors: Jackson P. Leonard, Austin, TX (US); Ashish Ghodasara, Cary, NC (US); Ajit Jariwala, Cary, NC (US); Jonathan Jackson, Cedar Grove, NC (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 16/033,829

(22) Filed: Jul. 12, 2018

(65) Prior Publication Data

US 2020/0019716 A1 Jan. 16, 2020

(51) Int. Cl.
| | | |
|---|---|---|
| *G06F 21/62* | (2013.01) | |
| *H04L 29/06* | (2006.01) | |
| *G06F 3/0484* | (2013.01) | |
| *H04L 12/18* | (2006.01) | |
| *H04L 9/32* | (2006.01) | |
| *H04N 7/14* | (2006.01) | |
| *H04N 7/15* | (2006.01) | |

(52) U.S. Cl.
CPC ........ *G06F 21/6218* (2013.01); *G06F 3/0484* (2013.01); *H04L 12/1822* (2013.01); *H04L 63/105* (2013.01); *H04L 65/403* (2013.01); *H04N 7/147* (2013.01); *H04N 7/15* (2013.01)

(58) Field of Classification Search
CPC . G06F 21/6218; G06F 3/0484; H04L 63/105; H04L 12/1822; H04L 65/403; H04N 7/15; H04N 7/147
See application file for complete search history.

(56) References Cited

U.S. PATENT DOCUMENTS

| | | | |
|---|---|---|---|
| 5,107,443 A | 4/1992 | Smith et al. | |
| 6,074,216 A * | 6/2000 | Cueto | G09B 5/14 |
| | | | 434/118 |
| 6,871,277 B1 | 3/2005 | Keronen | |
| 7,363,589 B1 * | 4/2008 | Maeng | G06Q 10/10 |
| | | | 715/719 |

(Continued)

*Primary Examiner* — Michael Simitoski
(74) *Attorney, Agent, or Firm* — Schmeiser, Olsen & Watts, LLP; Michael O'Keefe (57) ABSTRACT

A screen content management system and method for determining viewable screen content is provided. The method may include receiving a registration indication to register content as a private resource. The method may further include registering the content as the private resource. The method may also include assigning a unique identification code to the private resource. The method may additionally include receiving a viewing requirement for the private resource. The method may moreover include modifying a viewing definition for the private resource based on the viewing requirement. The method may further include receiving a request to display the private resource, the request being associated with user information. The method may also include determining whether the private resource is displayable based on the viewing definition of the private resource and the user information.

15 Claims, 7 Drawing Sheets

(56) References Cited

U.S. PATENT DOCUMENTS

| | | | | |
|---|---|---|---|---|
| 7,434,048 | B1* | 10/2008 | Shapiro | G06F 21/6218 713/165 |
| 8,739,242 | B2* | 5/2014 | Leeds | G06F 21/10 705/51 |
| 9,195,853 | B2 | 11/2015 | Fox et al. | |
| 10,528,764 | B2* | 1/2020 | Wilczynski | G06F 16/9566 |
| 10,592,683 | B1* | 3/2020 | Lim | G06F 21/604 |
| 2003/0037243 | A1 | 2/2003 | Gruteser et al. | |
| 2006/0259614 | A1* | 11/2006 | Patrick | G06F 21/6218 709/224 |
| 2007/0136466 | A1 | 6/2007 | Etelapera | |
| 2008/0034435 | A1 | 2/2008 | Grabarnik et al. | |
| 2008/0066185 | A1* | 3/2008 | Lester | G06F 21/6209 726/27 |
| 2008/0091778 | A1* | 4/2008 | Ivashin | G06Q 10/10 709/204 |
| 2008/0109878 | A1* | 5/2008 | Delegue | H04L 63/101 726/3 |
| 2008/0320000 | A1* | 12/2008 | Gaddam | H04L 67/06 |
| 2010/0013186 | A1 | 1/2010 | Markie | |
| 2010/0131868 | A1* | 5/2010 | Chawla | G06F 3/0481 715/759 |
| 2011/0321117 | A1* | 12/2011 | Nestler | G06F 21/604 726/1 |
| 2012/0011451 | A1* | 1/2012 | Bansal | H04N 7/15 715/753 |
| 2012/0036452 | A1* | 2/2012 | Coleman | G06F 21/55 715/751 |
| 2012/0110196 | A1* | 5/2012 | Balasaygun | G06Q 10/10 709/228 |
| 2013/0007895 | A1 | 1/2013 | Brolley et al. | |
| 2013/0145284 | A1* | 6/2013 | Anantharaman | H04L 63/10 715/753 |
| 2014/0006971 | A1* | 1/2014 | Bell | H04L 12/1822 715/753 |
| 2014/0025767 | A1* | 1/2014 | De Kezel | H04L 51/04 709/206 |
| 2014/0033265 | A1* | 1/2014 | Leeds | G06F 21/10 726/1 |
| 2014/0104372 | A1* | 4/2014 | Caiman | H04N 7/15 348/14.08 |
| 2015/0139210 | A1* | 5/2015 | Marin | H04W 48/16 370/338 |
| 2015/0288924 | A1* | 10/2015 | Liu | H04L 12/1822 348/14.08 |
| 2017/0118271 | A1* | 4/2017 | Reyes | H04L 67/06 |
| 2017/0223069 | A1* | 8/2017 | Arora | G06F 3/04817 |
| 2017/0237788 | A1* | 8/2017 | Xi | H04L 65/4038 709/204 |
| 2017/0339216 | A1* | 11/2017 | Carlos | H04L 67/06 |
| 2019/0073490 | A1* | 3/2019 | Agrawal | H04L 63/102 |

* cited by examiner

DETERMINING VIEWABLE SCREEN CONTENT

BACKGROUND

The present disclosure relates to systems and methods for determining viewable screen content, and more specifically to embodiments of a screen content management system and a method that handles requests to display content.

Electronic presentations may be given to groups of people in different places. The different people attending the electronic presentation may view the presentation at their own machine or device remotely. The electronic presentation may be viewed through a screen sharing application in which the presenter's screen is shared and viewable on each attendee's screen or may be electronically distributed (e.g., by email) for each attendee to open at his/her own machine. An electronic presentation may include non-confidential information or content which may be viewed by all attendees and/or confidential or sensitive information or content that should be restricted and viewed only by those attendees having the proper permission or credentials.

SUMMARY

An embodiment of the present disclosure relates to a method, and associated computer system and computer program product, for determining viewable screen content. The method may include receiving a registration indication to register content as a private resource. The method may further include registering the content as the private resource. The method may also include assigning a unique identification code to the private resource. The method may additionally include receiving a viewing requirement for the private resource. The method may moreover include modifying a viewing definition for the private resource based on the viewing requirement. The method may further include receiving a request to display the private resource, the request being associated with user information. The method may also include determining whether the private resource is displayable based on the viewing definition of the private resource and the user information.

DETAILED DESCRIPTION

An electronic presentation (e.g., a shared screen) may include confidential or sensitive information or content that should be restricted and viewed only by those attendees having the proper permission or credentials. In some situations, the presenter is not the person sharing the screen as this task may be delegated to an assistant, and the assistant may not have the proper permission or credentials to view all of the content in the presentation and on the screen. As such, there may be a need for the ability to share content for an electronic presentation where certain participants (and even the screen sharer) are unable to view all of the content on the sharer's screen.

Some systems may allow the presenter to decide which attendees can view particular portions of the screen being shared, but they may not allow the screen sharer to share content that the screen sharer is unable to view and they also may not ensure that the presenter's authorization decisions are compliant with various organizational standards. Thus, there may be a need for a screen content management system and/or methods for determining viewable screen content to make decisions about which content or resources in an application or presentation are visible to certain users attempting to access or view the content (e.g., via a screen sharing application).

Participants may be in an online meeting hosted on an application server and each piece of content displayed may have a unique identification code (UIC) or number associated with it. The UIC may be referenced by a centralized authorization server (e.g., in an enterprise environment) which may also be referred as an identity management server or resource management server. When the presenter or screen sharer displays content on the screen, each piece of content may be polled against a centralized authorization server to determine whether the participant attempting to view that content has the authorization to view it.

Using the techniques and features described in the present disclosure, an author may assign viewing requirements for each piece of content or resource individually and, upon request to view the content, viewing requirements for each piece of content may be processed individually at the central authorization server to determine whether the content will be visible on each end user's screen. This is processing may be performed by the centralized authorization server that stores viewing requirements/definitions for the content and user details.

In an embodiment, video or content/resource data may be transmitted through an application server (e.g., a screen sharing application host server) which may transmit the video or content/resource data to computing systems of meeting participants. Once data is at the participant's computing system, the application (e.g., screen sharing application) may transmit a series of requests to the centralized authorization server asking if the user running the application has access to view the content/resources that were sent by the screen sharing application. Based on the results from the centralized authorization server, the screen sharing application at the participant's computer system may generate a screen that displays or does not display various pieces of content on the screen, depending on whether the participant has access to view the content/resource.

Figure 1:
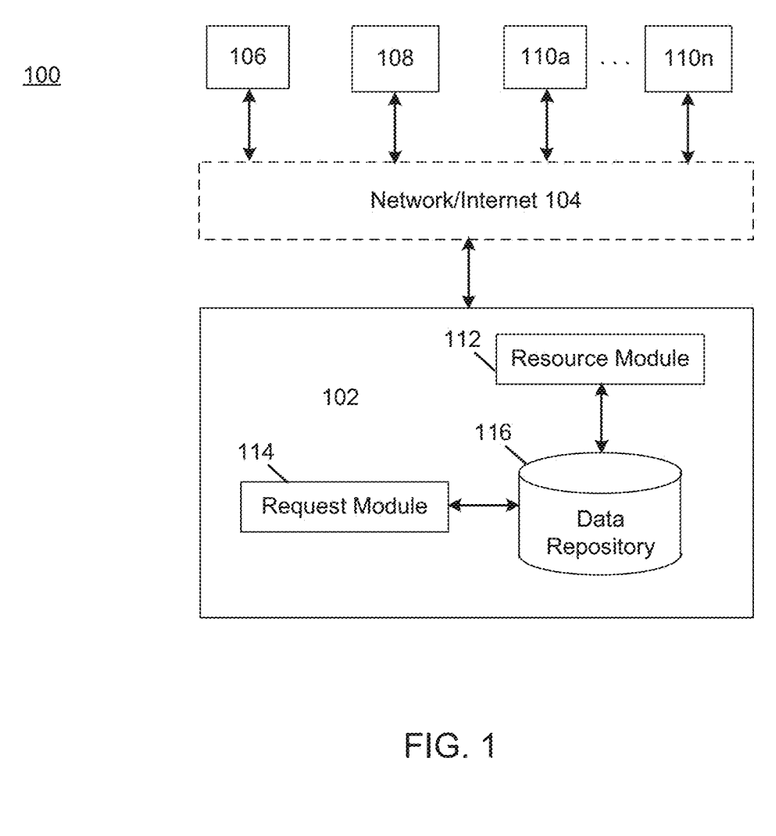
FIG. 1 depicts a block diagram of a screen content management system, in accordance with embodiments of the present disclosure.

Referring to the drawings, FIG. 1 depicts a block diagram of a screen content management system 102 in a presentation environment 100, in accordance with embodiments of the present disclosure. Embodiments of the screen content management system 102 may determine which content can be viewed by various users attempting to access or view the content in the presentation environment 100. The various computer systems shown in FIG. 1, including screen content management system 102, may be similar to and/or include similar components to the computer system of FIG. 5. In embodiments, screen content management system 102 may be a central authorization server or centralized authorization server as described herein. The terms central authorization server and centralized authorization server have the same meaning and may be used interchangeably in the present disclosure.

In an embodiment, the central authorization server may integrate with an existing authorization server that an enterprise or organization may have. For example, a centralized identity management server may include details about every employee or user at an enterprise or organization including group membership, employee level, user name, etc.

Screen content management system 102 may be in communication with a network 104 and/or the Internet through which screen content management system 102 may communicate with various other computer systems and machines. For example, screen content management system 102 may communicate with an author computer system 106, a screen sharing application host server or computer system 108, and various user computer systems 110a . . . 110n.

Screen content management system 102 may include resource module 112, in accordance with embodiments of the present disclosure. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 102. A module (whether hardware, software, or a combination thereof) may be designed to implement or execute one or more particular functions, routines, or operations, such as those shown in the blocks of FIG. 2.

Embodiments of the resource module 112 may include one or more components of hardware and/or software program code for receiving registration indications to register content, registering the content as a private resource, assigning a unique identification code (UIC) to the private resource, receiving a viewing requirement for the private resource, and creating and/or modifying a viewing definition for the private resource. Further, embodiments of the resource module 112 may create, store and organize resource profiles and/or definitions and may store data received by the computer system 102 from computer systems 106, 108, and/or 110a-110n, by associating the data with one or more fields. The resource module 112 may create, store, and maintain profiles for users of the computing systems 106, 108, and/or 110a-110n and/or the presentation environment 100 and/or may register identifying information about users of the 106, 108, and/or 110a-110n as well as coworkers, clients, business contacts, and the like, who may frequently attend electronic presentations in the presentation environment 100. For instance, offices or business equipped with a presentation environment 100 and/or screen content management system 102 may obtain personalized information (e.g., employee level or rank, etc.) of presentation authors, presenters, presentation sharers, and presentation invitees and attendees.

Screen content management system 102 may also include a request module 114. Embodiments of the request module 114 may refer to configurations of hardware, software program code, or combinations of hardware and software programs, capable of receiving requests to display private resources, determining whether private resources can be displayed for certain users based on corresponding user information, and transmitting display indications and block indications for private resources. Embodiments of the request module 114 may receive and store data from computer systems 106, 108, and/or 110a-110n. In further embodiments, the request module 114 may receive requests to display private resources and associated user information, compare the user information with viewing definitions corresponding to the private resources, determine if the private resources are displayable based on the viewing definitions and the user information, and transmit display or block indications for the private resources to one or more of user computing systems 110a-110n (users of which may be viewing a corresponding presentation).

Figure 2:
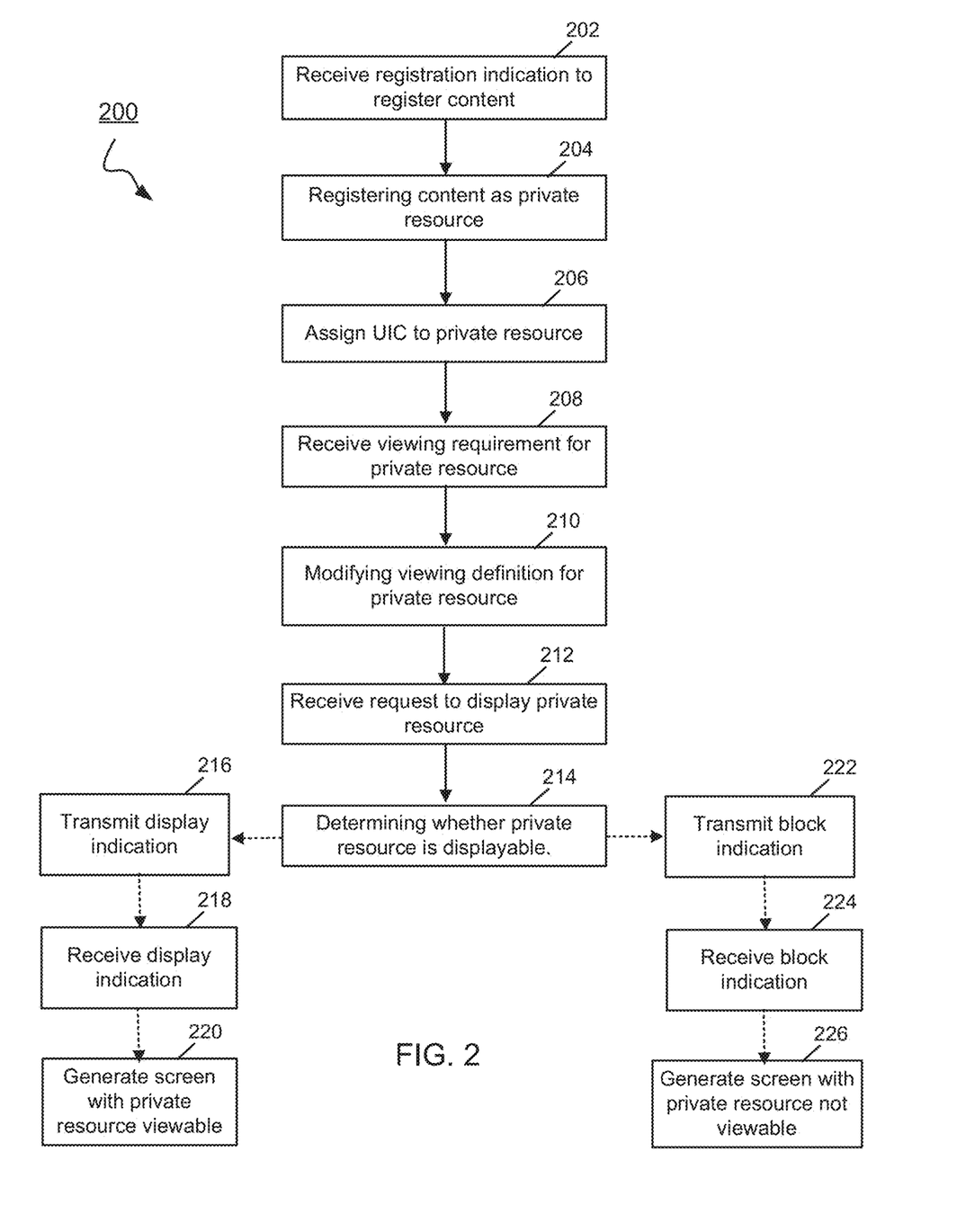
FIG. 2 depicts a flow chart of a method for determining viewable screen content, in accordance with embodiments of the present disclosure.

Referring now to FIG. 2, a flow chart of a process 200 for determining viewable screen content, in accordance with embodiments of the present disclosure, is shown. One embodiment of a process 200 or algorithm that may be implemented for determining viewable screen content in accordance with the screen content management system 102 for presentation environment 100 described in FIG. 1 may use one or more computer systems as defined generically in FIG. 5, and more specifically by the embodiments of FIG. 1. Further, process 200 may run on or be executed by a central authorization server which may be similar to screen content management system 102 and may be part of or may use portions of resource module 112 and/or request module 114.

Figure 3:
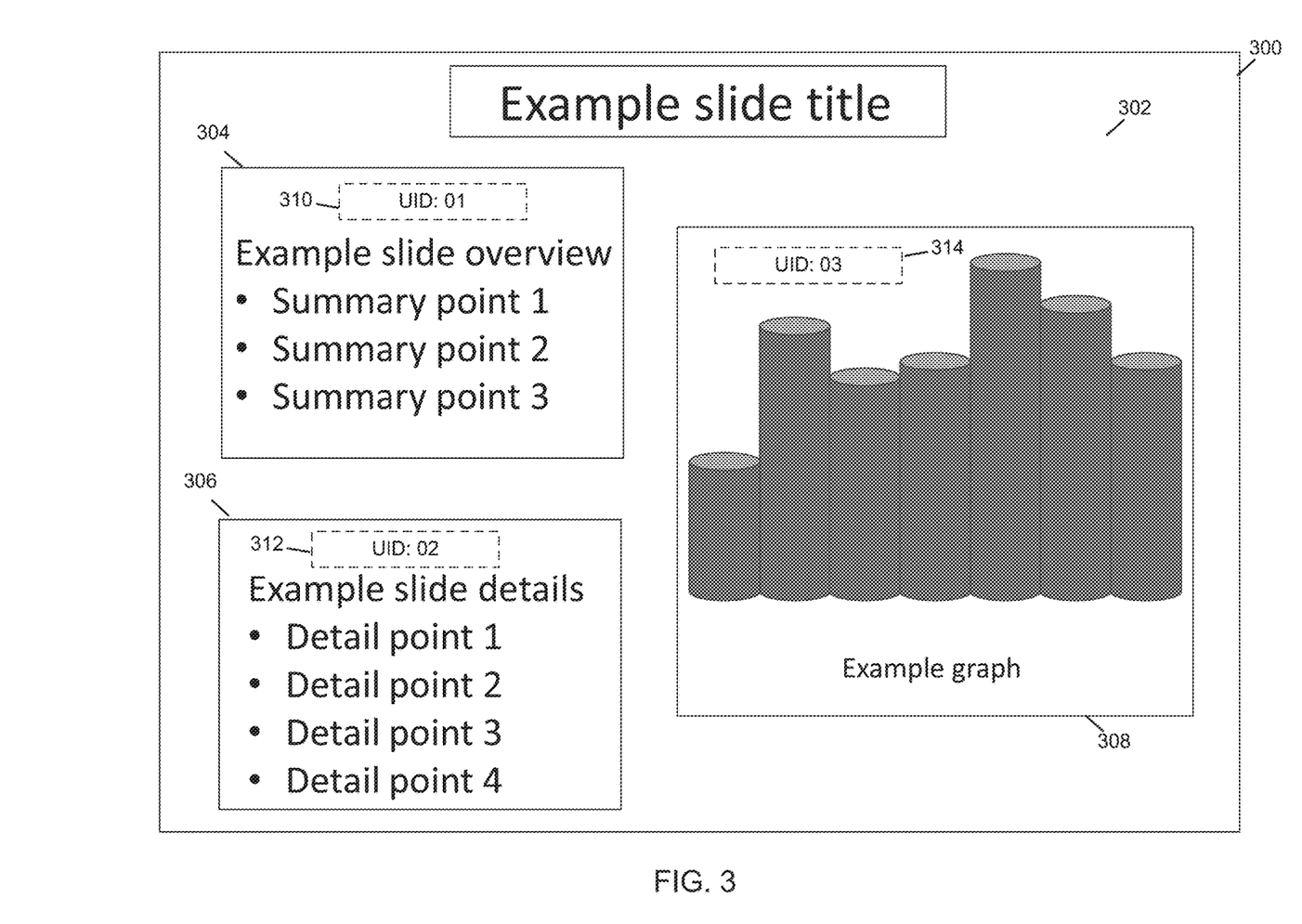
FIG. 3 depicts an example presentation screen in accordance with embodiments of the present disclosure.

Embodiments of the process 200 for determining viewable screen content may include operations or steps 202-226 (among other operations not shown) as shown in FIG. 2. In an embodiment, process 200 may receive 202 (e.g., at a processor, computer system, or central authorization server) a registration indication to register content as a private resource. Referring now also to FIG. 3, an example presentation screen 300 is shown. Presentation screen 300 may be generated at, for example, author computer system 106. Author computer system 106 may be used by an author or creator of a presentation 302. The author may create one or more pieces or content including, for example, text boxes 304 and 306 and graph 308.

One or more of text boxes 304 and 306 and graph 308 may include sensitive and/or confidential information that should be restricted and viewed only by users having proper permission or credentials for viewing the information. For example, an entity may have multiple levels of employees including executives, directors, engineers, and assistants (among others). Executives may be the highest level in terms of ability/permission to view sensitive information. Directors may be able to view more sensitive information than engineers or assistants, but less than executives. Engineers may be able to view more sensitive information that assistants, but less than executives and directors. Assistants may be able to view the least amount of sensitive information.

The author may include information in text box 304 that is viewable only by executives, directors, and engineers but not assistants. Further, the author may include information in text box 306 that is viewable only by executives but not directors, engineers, or assistants. Additionally, the author may include information in graph 308 that is viewable by executives and directors, but not by engineers or assistants. Thus, the author may wish to give an electronic presentation in which various pieces of content of presentation 302 can be viewed only by those with the proper permissions or credentials, as described above.

Continuing with the above example, as the author creates presentation 302, the author may wish to send registration indications associated with various pieces content in presentation 302 in order to register the pieces of content as private resources. For example, as the author creates text box 304, the author may right-click on text box 304 and make a selection to register text box 304 as a private resource. In response, author computer system 106 may transmit a registration indication associated with text box 304 (e.g., a message or communication) to the central authorization server (e.g., screen content management system 102) over network 104 or the Internet. In this way, process 200 may receive 202 the registration indication to register content (e.g., text box 304) as a private resource at, for example, the central authorization server or screen content management system 102. It should be noted that right-clicking on content is provided as an example action usable by the author to select content to register as a private resource and is discussed for illustrative purposes only. Various user interfaces and other actions usable by the author to select content including, but not limited to, highlighting, dragging and dropping, speech commands, and item browsing/menu selection of items or content as private resources.

Further, process 200 may register 204 the content (e.g., text box 304) as a private resource. This may include creating a record of the private resource (e.g., via resource module 112) or an entry in a database associated with the private resource. Process 200 may assign 206 a unique identification code (UIC) to text box 304 once it is registered as a private resource or as part of the registration process. As shown in FIG. 3 for illustrative purposes only, text box 304 may be assigned UIC 310 (i.e., "01") which may be stored in connection with a private resource entry associated text box 304 (e.g., at data repository 116).

Process 200 may also receive 208 a viewing requirement for the private resource (e.g., text box 304). The viewing requirement may be indicated by the author (e.g., by right clicking on the content and selecting from a drop down menu, etc.) and may include an employee level, group, or employee-specific or user-specific information representative of who can view the content/resource. The viewing requirement associated with text box 304 may be transmitted to the central authorization server (e.g., screen content management system 102) over network 104 or the Internet. For example, the viewing requirement for text box 304 may be engineer level or greater. Thus, those employees with an employee level of engineer or greater (e.g., engineer, director, and executive but not assistant) may view the private resource (e.g., text box 304).

Continuing with the example above, the author may also have registered text box 306 and graph 308 as private resources and those resources may be assigned UICs in a manner similar to that of text box 304, as described above. The viewing requirement for text box 306 may be executive level (e.g., executive but not director, engineer or assistant) and the viewing requirement for graph 308 may be director level or greater (e.g., director and executive but not engineer or assistant).

Process 200 may create or modify 210 a viewing definition for the private resource based on the viewing requirement. The viewing definition may be part of the record of the private resource (e.g., created via resource module 112) or an entry in a database associated with the private resource. For example, viewing definitions for private resources such as text boxes 304 and 306 and graph 308 may be associated with UICs 310, 312, and 314, respectively, corresponding to text boxes 304 and 306 and graph 308, respectively, as indicated in FIG. 3. The records, entries, UICs, and viewing definitions for the private resources may be created and managed by resource module 112 and stored at data repository 116. Thus, the viewing definition for text box 304 may reflect engineer or greater, the viewing definition for text box 306 may reflect executive, and the viewing definition for graph 308 may reflect director or greater, when referred to by process 200.

Figure 4:
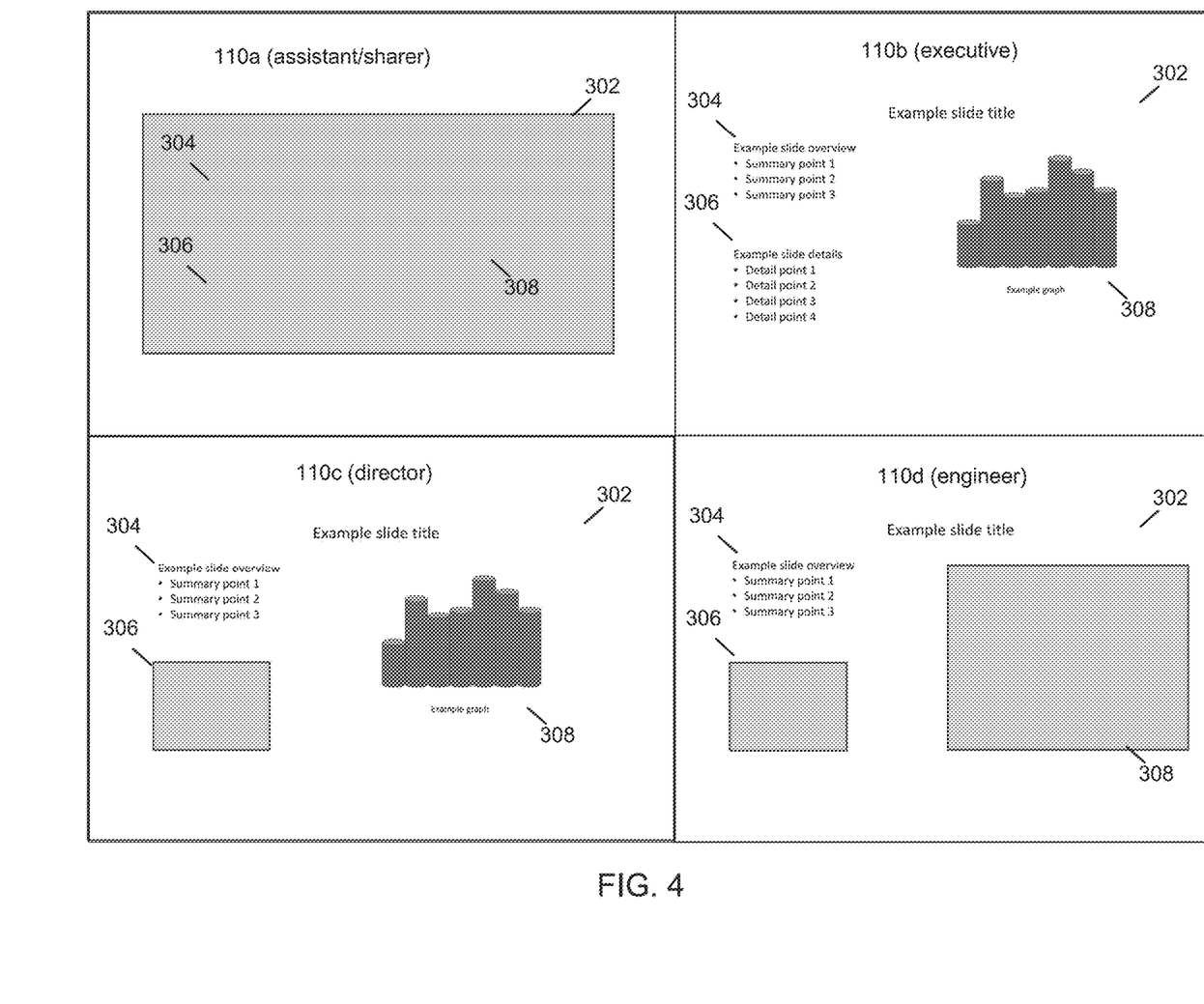
FIG. 4 depicts example generated presentation screens for various users in accordance with embodiments of the present disclosure.

The author may complete the presentation 302 and may wish to display the presentation to various users in the presentation environment 100. Users of computer systems 110a . . . 110n may attempt to access or view the presentation. In an embodiment, a screen sharing application host or computer system 108 may be used to deploy the presentation 302 over network 104 and/or the Internet such that presentation 302 is viewable by users of computer systems 110a . . . 110n. Referring now to FIG. 4, example screens of computer systems 110a . . . 110n corresponding to presentation 302 are shown.

Computer systems 110a . . . 110n may use a runtime application or environment to view presentation 302, which may be shared over network 104 or the Internet using a screen sharing application and/or screen sharing application host server. In embodiments, the screen sharing application host server may or may not be separate from the central authorization server or computing system 102. In embodiments, a screen sharing application may be run from either a separate screen sharing application host server or from the central authorization server. Further, in embodiments, a separate screen sharing application may not be necessary and the presentation may be deployed directly from the author or sharer's computer system to one or more of computer systems 110a . . . 110n over network 104 and/or the Internet. The screen sharing application may interact with the central authorization server to send and receive information, messages, requests, etc., as described herein.

Users of computer systems 110a . . . 110n may attempt to view the presentation using the runtime application or environment (e.g., the screen sharing application). The run time application may request to display various private resources. The request may be to computer system 102 or the central authorization server and may include user information about the user of computer systems 110a . . . 110n. Process 200 may receive 212 the request to display a private resource and the request may be associated with or include user information (e.g., employee level of the user, a group of the user, a user identification, or other user-specific information).

Request module 114 may handle requests to display private resources. Process 200 may, with use of request module 114, determine 214 whether the private resource is displayable based on the viewing definition of the private resource and the user information. For example, and referring now to FIG. 4, the author of presentation 302 may delegate sharing of the presentation to his or her assistant. The assistant may use computer system 110a to share the presentation. As the assistant attempts to view or access presentation 302 in the runtime environment (which may be the screen sharing application), the runtime environment may request (e.g., from the central authorization server or computer system 102) to display various private resources of presentation 302. The request may be sent with user information about the assistant (e.g., indicating that the user is an assistant).

Process 200 may receive the requests and corresponding user information and determine whether the private resources of presentation 302 are displayable to the assistant. For example, process 200 may compare the viewing definitions corresponding to text boxes 304 and 306 and graph 308 with the user information corresponding to the user to determine whether text boxes 304 and 306 and graph 308 are displayable to the assistant. Because the viewing definition of text box 304 is engineer or greater, text box 304 is not displayable to the assistant. Because the viewing definition of text box 306 is executive, text box 306 is not displayable to the assistant. Because the viewing definition of graph 308 is director or greater, graph 308 is not displayable to the assistant. Thus, none of the private resources of presentation 302 are displayable to the assistant on computer system 110a.

Accordingly, in response to determining that the private resource is not displayable based on the viewing definition of the private resource (e.g., text boxes 304 and 306 and graph 308) and the user information (e.g., assistant level), process 200 may transmit 222 one or more block indications from the central authorization server (e.g., computer system 102) to a device associated with the request (e.g., computer system 110a of the assistant). The block indications may be received 224 from the central authorization server (e.g., computer system 102) at the device (e.g., computer system 110a of the assistant). The runtime application of the device (e.g., (e.g., computer system 110a of the assistant) may generate 226 a screen at the device from which the one or more private resources are not viewable.

As a result, as shown in FIG. 4, text boxes 304 and 306 and graph 308 are not viewable by the assistant on computer system 110a and may be hashed-out, greyed-out, or not displayed at all by the runtime application of computer system 110a. In this way, the techniques and features of the present disclosure may allow for a system where content being shared or that exists in a shared environment that can be shared or presented by a user (e.g., the assistant) who does not have access to view the content. In other words, the assistant may simply use computer system 110a to serve (in part) or send the content to the screen sharing application host or to attendees of the presentation so that the actual presenter does not have to be burdened with sharing his or her screen. The assistant may move the shared screen from one portion of the presentation to another upon instruction or timing from the presenter without actually viewing the content. For example, the assistant may be sharing sensitive financial data on the screen without viewing the sensitive financial data itself.

Further, an engineer may use computer system 110d to view the presentation. As the engineer attempts to view or access presentation 302 in the runtime environment of computer system 110d (which may be a screen sharing application), the runtime environment may request (e.g., from the central authorization server or computer system 102) to display various private resources of presentation 302. The request may be sent with user information about the engineer (e.g., indicating that the user is an engineer).

Process 200 may receive the requests and corresponding user information and determine whether the private resources of presentation 302 are displayable to the engineer. For example, process 200 may compare the viewing definitions corresponding to text boxes 304 and 306 and graph 308 with the user information corresponding to the user to determine whether text boxes 304 and 306 and graph 308 are displayable to the engineer. Because the viewing definition of text box 304 is engineer or greater, text box 304 is displayable to the engineer. Because the viewing definition of text box 306 is executive, text box 306 is not displayable to the engineer. Because the viewing definition of graph 308 is director or greater, graph 308 is not displayable to the engineer. Thus, of the private resources of presentation 302, only text box 304 is displayable to the engineer on computer system 110d.

Accordingly, in response to determining that the private resource is displayable based on the viewing definition of the private resource (e.g., text box 304) and the user information (e.g., engineer level), process 200 may transmit 216 a display indication from the central authorization server (e.g., computer system 102) to a device associated with the request (e.g., computer system 110d of the engineer). The display indication may be received 218 from the central authorization server (e.g., computer system 102) at the device (e.g., computer system 110d of the engineer). The runtime application of the device (e.g., computer system 110d of the engineer) may generate 220 a screen at the device from which the private resource is viewable.

Additionally, in response to determining that the private resources are not displayable based on the viewing definition of the private resource (e.g., text box 306 and graph 308) and the user information (e.g., engineer level), process 200 may transmit 222 one or more block indications from the central authorization server (e.g., computer system 102) to a device associated with the request (e.g., computer system 110d of the engineer). The block indications may be received 224 from the central authorization server (e.g., computer system 102) at the device (e.g., computer system 110d of the engineer). The runtime application of the device (e.g., computer system 110d of the engineer) may generate 226 a screen at the device from which the one or more private resources are not viewable.

As a result, as shown in FIG. 4, text box 304 is viewable and text box 306 and graph 308 are not viewable by the engineer on computer system 110d. Text box 306 and graph 308 may be hashed-out, greyed-out, or not displayed at all by the runtime application of computer system 110d.

Also, a director may use computer system 110c to view the presentation. As the director attempts to view or access presentation 302 in the runtime environment of computer system 110c (which may be a screen sharing application), the runtime environment may request (e.g., from the central authorization server or computer system 102) to display various private resources of presentation 302. The request may be sent with user information about the director (e.g., indicating that the user is a director).

Process 200 may receive the requests and corresponding user information and determine whether the private resources of presentation 302 are displayable to the director. For example, process 200 may compare the viewing definitions corresponding to text boxes 304 and 306 and graph 308 with the user information corresponding to the user to determine whether text boxes 304 and 306 and graph 308 are displayable to the director. Because the viewing definition of text box 304 is engineer or greater, text box 304 is displayable to the director. Because the viewing definition of text box 306 is executive, text box 306 is not displayable to the director. Because the viewing definition of graph 308 is director or greater, graph 308 is displayable to the director. Thus, of the private resources of presentation 302, text box 304 and graph 308 are displayable to the director on computer system 110c while text box 306 is not.

Accordingly, in response to determining that the private resources are displayable based on the viewing definition of the private resource (e.g., text box 304 and graph 308) and the user information (e.g., director level), process 200 may transmit 216 a display indication from the central authorization server (e.g., computer system 102) to a device associated with the request (e.g., computer system 110c of the director). The display indication may be received 218 from the central authorization server (e.g., computer system 102) at the device (e.g., computer system 110c of the director). The runtime application of the device (e.g., computer system 110c of the director) may generate 220 a screen at the device from which the private resource is viewable.

Additionally, in response to determining that the private resource is not displayable based on the viewing definition of the private resource (e.g., text box 306) and the user information (e.g., director level), process 200 may transmit 222 a block indication from the central authorization server (e.g., computer system 102) to a device associated with the request (e.g., computer system 110c of the director). The block indication may be received 224 from the central authorization server (e.g., computer system 102) at the device (e.g., computer system 110c of the director). The runtime application of the device (e.g., computer system 110c of the director) may generate 226 a screen at the device from which the private resource is not viewable.

As a result, as shown in FIG. 4, text box 304 and graph 308 are viewable and text box 306 and is not viewable by the director on computer system 110c. Text box 306 may be hashed-out, greyed-out, or not displayed at all by the runtime application of computer system 110c.

Moreover, an executive may use computer system 110b to view the presentation and may use a screen of computer system 110b for reference while giving or moderating the presentation. As the executive attempts to view or access presentation 302 in the runtime environment of computer system 110b (which may be a screen sharing application), the runtime environment may request (e.g., from the central authorization server or computer system 102) to display various private resources of presentation 302. The request may be sent with user information about the executive (e.g., indicating that the user is an executive).

Process 200 may receive the requests and corresponding user information and determine whether the private resources of presentation 302 are displayable to the executive. For example, process 200 may compare the viewing definitions corresponding to text boxes 304 and 306 and graph 308 with the user information corresponding to the user to determine whether text boxes 304 and 306 and graph 308 are displayable to the executive. Because the viewing definition of text box 304 is engineer or greater, text box 304 is displayable to the executive. Because the viewing definition of text box 306 is executive, text box 306 is displayable to the director. Because the viewing definition of graph 308 is director or greater, graph 308 is displayable to the executive. Thus, of the private resources of presentation 302, text boxes 304 and 306 and graph 308 are displayable to the executive on computer system 110b.

Accordingly, in response to determining that the private resources are displayable based on the viewing definition of the private resources (e.g., text boxes 304 and 306 and graph 308) and the user information (e.g., executive level), process 200 may transmit 216 a display indication from the central authorization server (e.g., computer system 102) to a device associated with the request (e.g., computer system 110b of the executive). The display indication may be received 218 from the central authorization server (e.g., computer system 102) at the device (e.g., computer system 110b of the executive). The runtime application of the device (e.g., computer system 110b of executive) may generate 220 a screen at the device from which the private resources are viewable. As a result, as shown in FIG. 4, text boxes 304 and 306 and graph 308 are viewable by the executive on computer system 110b.

It should be noted that while the content and private resources described in the examples shown in the present disclosure are text boxes and graphs, this content is described for illustrative purposes only and is not intended to be a limitation of the present disclosure. The techniques and features described in the present disclosure for screen content management may be applied to any files, text, images, video, audio, documents, screen portions, user interfaces or other content presentable in the presentation environment described in the present disclosure.

Further, while the viewing requirements and definitions discussed in the present disclosure have been with regard to user or employee levels (e.g., executive, director, engineer, assistant, etc.), this is for illustrative purposes only and not intended to be a limitation of the present disclosure. For example, the viewing requirements and definitions may include user groups (e.g., committees, departments, project members, teams, etc.) or specific user identifications such as user names, email addresses, or even names of users or employees.

Additionally, while the present disclosure has been discussed with regard to a screen sharing application, this is not intended to be a limitation of the present disclosure. Another application, such as a word-processing application, presentation creating application, spreadsheet application, CAD application, or any other application which may be used to create content can interact with the central authorization server to register content as private resources, create viewing definitions for the content, and display or block private resources at a user's computer system. For example, an author may create a presentation in which one slide is only viewable by executives, and the author may send that slide to other users to view locally outside of a screen sharing application. The presentation application used to create/view the software may itself communicate, from another user's computer system, to the central authorization server to determine whether to display or block private resources at the user's computer system based on whether that user is an executive, as described in process 200.

In an implementation, when an application (e.g., a screen sharing application, word-processing application, presentation creating application, spreadsheet application, CAD application, or any other application which may be used to create content) is run locally on a computer system, its runtime environment may register each piece of available content that is unregistered with the centralized authorization server as a private resource. The centralized authorization server may assign each private resource a UIC and the private resources may be "owned" by the end-user who initiated the process. The application end-user may define a list of users or user groups who are authorized to view the private resources on an individual basis. Content which is already registered at the centralized authorization server may not be assigned new UICs, but their viewing requirements/definitions may be loaded, updated/modified, or determined (e.g., via the centralized authorization server) and their accessibility or displayability to a user may be determined at runtime.

Figure 5:
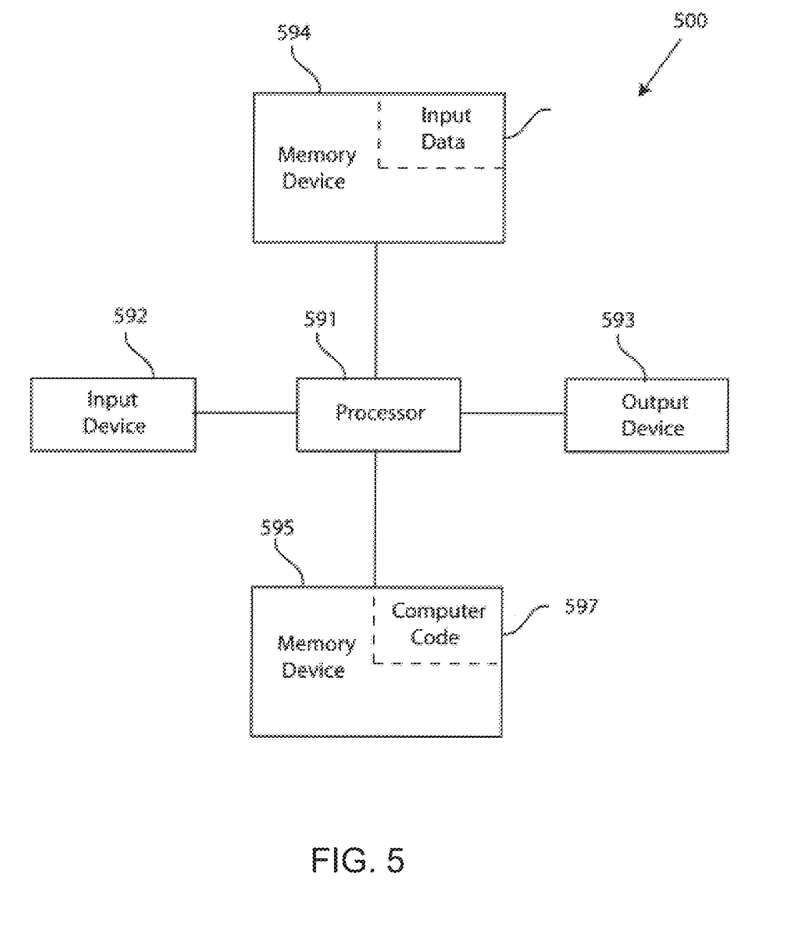
FIG. 5 illustrates a block diagram of a computer system for the screen content management system of FIG. 1, capable of implementing methods for determining viewable screen content of FIG. 2, in accordance with embodiments of the present disclosure.

FIG. 5 illustrates a block diagram of a computer system 500 that may be included in the system (e.g., as computer system 102 or a central authorization server) of FIG. 1 and for implementing the method or process of FIG. 2 in accordance with the embodiments of the present disclosure. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method or process for determining viewable screen content, in the manner prescribed by FIG. 2 using the screen content management system of FIG. 1, wherein the instructions of the computer code 597 may be executed by processor 591 via memory device 595. The computer code 597 may include software or program instructions that may implement one or more algorithms for implementing the method or process of determining viewable screen content, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the sensors 110. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 116 as shown in FIG. 1.

As will be appreciated by one skilled in the art, in a first embodiment, the present disclosure may describe a method; in a second embodiment, the present disclosure may describe a system; and in a third embodiment, the present disclosure may describe a computer program product. Any of the components of the embodiments of the present disclosure can be deployed, managed, serviced, etc. by a service provider that offers to deploy or integrate computing infrastructure with respect to screen content management systems and methods. Thus, an embodiment of the present disclosure is a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to determine viewable screen content using a viewing definitions of private resources and user information. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method or process for determining viewable screen content. Thus, the present disclosure describes a process for supporting, deploying and/or integrating computer infrastructure, integrating, hosting, maintaining, and deploying computer-readable code into the computer system 500, wherein the code in combination with the computer system 500 is capable of performing a method or process for determining viewable screen content.

A computer program product of the present disclosure comprises one or more computer readable hardware storage devices having computer readable program code stored therein, said program code containing instructions executable by one or more processors of a computer system to implement the methods or processes of the present disclosure.

A computer system of the present disclosure comprises one or more processors, one or more memories, and one or more computer readable hardware storage devices, said one or more hardware storage devices containing program code executable by the one or more processors via the one or more memories to implement the methods or processes of the present disclosure.

The present disclosure describes a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
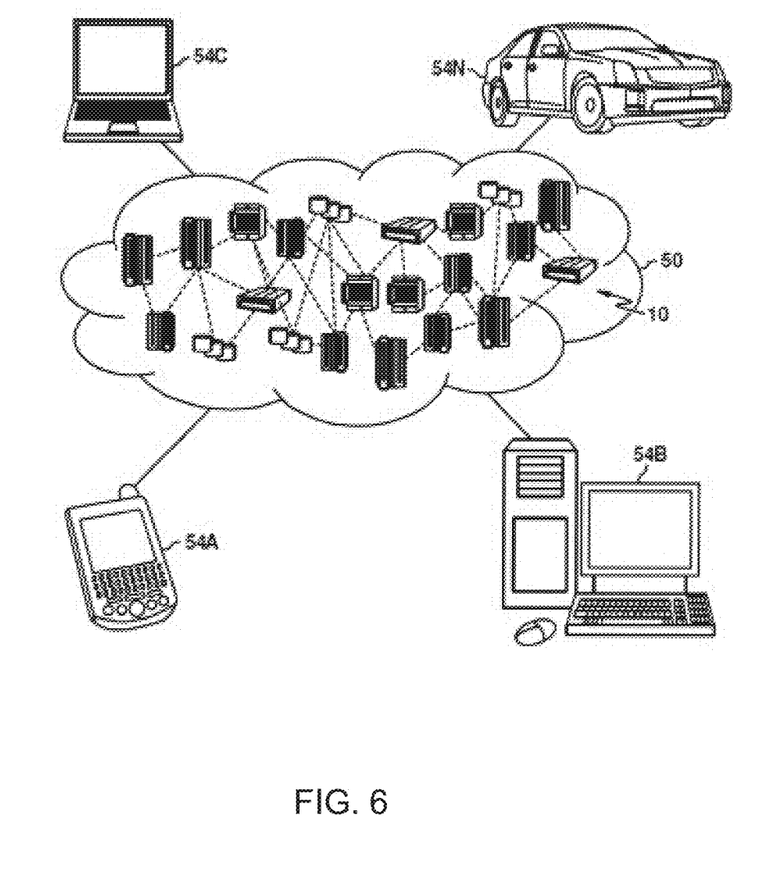
FIG. 6 depicts a cloud computing environment, in accordance with embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
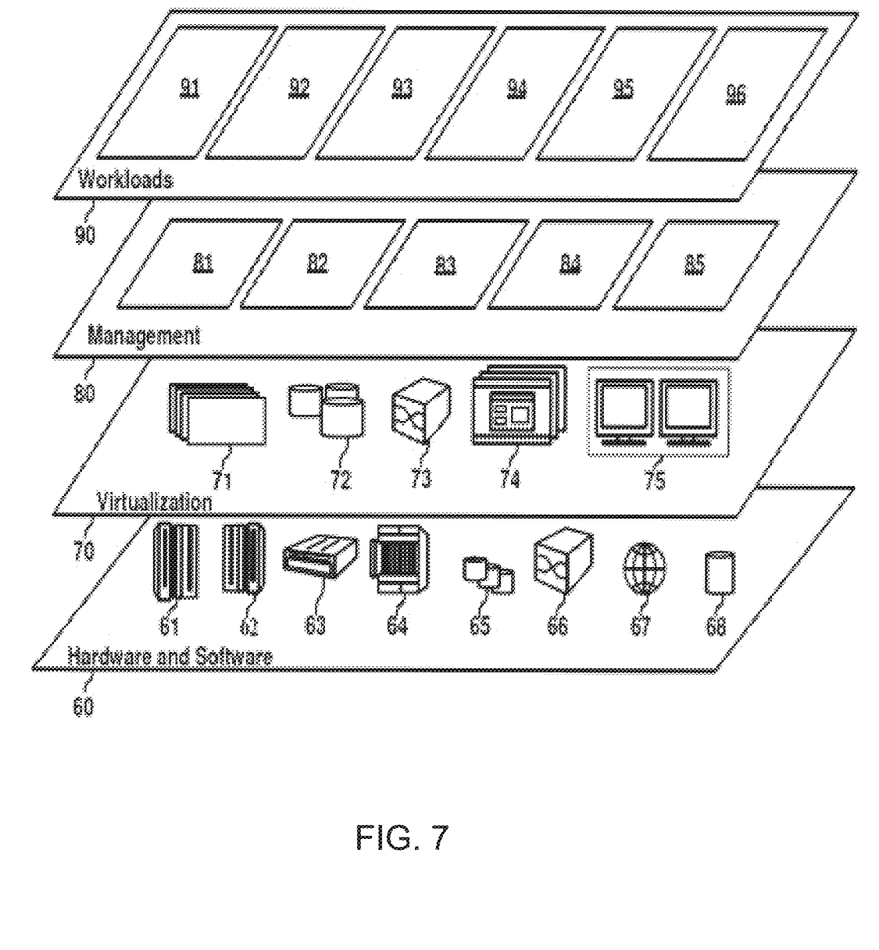
FIG. 7 depicts abstraction model layers, in accordance with embodiments of the present disclosure.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and calendar management for determining availability of an invitee 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for determining viewable screen content, said method comprising:
    receiving, by a central authorization server from an author computer system of an author that created a presentation of a plurality of content to be presented to a plurality of participants who are participating in an online meeting in which the presentation is being presented, a communication to register each content, each participant being an employee of an organization, each participant having access to, and being at, a respective participant computer system, an assistant to the author being one of the participants;
    in response to receiving the communication to register each content, registering, by the central authorization server, each content as a private resource;
    after said registering each content, assigning, by the central authorization server, a unique identification code to each content;
    receiving, by the central authorization server from the author computer system, a viewing requirement for each content to determine whether each content may be viewed on a screen of a participant computer system of each participant, said viewing requirement for each content being dependent on an employee status of rank, level, or group within the organization, said viewing requirement for each content not allowing each content to be viewed on the screen of the participant computer system of the assistant to the author;
    storing, by the central authorization server in a data repository in the central authorization server, the unique identification code assigned to each content and the viewing requirement for each content;
    receiving, by a screen sharing application computer system from the participant computer system of the assistant to the author, the plurality of content;
    sending, by the screen sharing application computer system to the participant computer system of each participant, the plurality of content;
    after each participant computer system has received each content from the screen sharing application computer system, receiving, by the central authorization server from each participant computer system, a request to determine whether the participant at each participant computer system has access to view each content, said request received from each participant computer system including the employee status of the participant at each computer system;
    after said receiving the request from each participant computer system, generating, by the central authorization server, a display/block indication to either display or block each content at each participant computer system, said generating the display/block indication based on the viewing requirement for each content and the employee status of the participant of each computer system; and
    sending, by the central authorization server to each participant computer system, each display/block indication, which enables a screen sharing application at each participant computer system to either display or block each content on the screen of each participant computer system in accordance with each display/block indication,
    wherein the central authorization server, each participant computer system including the participant computer system of the assistant to the author, the author computer system of the author, and the screen sharing application computer system are different computer systems.

2. The method of claim 1, wherein a first content of the plurality of content is displayed, and a second content of the plurality of content is blocked, in the screen displayed to one participant of the plurality of participants.

3. The method of claim 1, wherein a first content of the plurality of content is displayed, and both a second content and a third content of the plurality of content is blocked, in the screen displayed to one participant of the plurality of participants.

4. The method of claim 1, wherein each content of the plurality of content is displayed in the screen displayed to one participant of the plurality of participants.

5. The method of claim 1, wherein each content of the plurality of content is blocked in the screen displayed to one or more participants of the plurality of participants, and wherein the one or more participants include the assistant to the author.

6. A computing system for determining viewable screen content, said computing system comprising: one or more processors; one or more memory devices coupled to the one or more processors; and one or more computer readable storage devices coupled to the one or more processors, wherein the one or more storage devices contain program code executable by the one or more processors via the one or more memory devices to implement a method for determining viewable screen content, said method comprising:
    receiving, by a central authorization server from an author computer system of an author that created a presentation of a plurality of content to be presented to a plurality of participants who are participating in an online meeting in which the presentation is being presented, a communication to register each content, each participant being an employee of an organization, each participant having access to, and being at, a respective participant computer system, an assistant to the author being one of the participants;

in response to receiving the communication to register each content, registering, by the central authorization server, each content as a private resource;

after said registering each content, assigning, by the central authorization server, a unique identification code to each content;

receiving, by the central authorization server from the author computer system, a viewing requirement for each content to determine whether each content may be viewed on a screen of a participant computer system of each participant, said viewing requirement for each content being dependent on an employee status of rank, level, or group within the organization, said viewing requirement for each content not allowing each content to be viewed on the screen of the participant computer system of the assistant to the author;

storing, by the central authorization server in a data repository in the central authorization server, the unique identification code assigned to each content and the viewing requirement for each content;

receiving, by a screen sharing application computer system from the participant computer system of the assistant to the author, the plurality of content;

sending, by the screen sharing application computer system to the participant computer system of each participant, the plurality of content;

after each participant computer system has received each content from the screen sharing application computer system, receiving, by the central authorization server from each participant computer system, a request to determine whether the participant at each participant computer system has access to view each content, said request received from each participant computer system including the employee status of the participant at each computer system;

after said receiving the request from each participant computer system, generating, by the central authorization server, a display/block indication to either display or block each content at each participant computer system, said generating the display/block indication based on the viewing requirement for each content and the employee status of the participant of each computer system; and sending, by the central authorization server to each participant computer system, each display/block indication, which enables a screen sharing application at each participant computer system to either display or block each content on the screen of each participant computer system in accordance with each display/block indication, wherein the central authorization server, each participant computer system including the participant computer system of the assistant to the author, the author computer system of the author, and the screen sharing application computer system are different computer systems.

7. The computing system of claim 6, wherein a first content of the plurality of content is displayed, and a second content of the plurality of content is blocked, in the screen displayed to one participant of the plurality of participants.

8. The computing system of claim 6, wherein a first content of the plurality of content is displayed, and both a second content and a third content of the plurality of content is blocked, in the screen displayed to one participant of the plurality of participants.

9. The computing system of claim 6, wherein each content of the plurality of content is displayed in the screen displayed to one participant of the plurality of participants.

10. The computing system of claim 6, wherein each content of the plurality of content is blocked in the screen displayed to one or more participants of the plurality of participants, and wherein the one or more participants include the assistant to the author.

11. A computer program product, comprising one or more computer readable hardware storage devices storing computer readable program code, said computer readable program code comprising an algorithm that when executed by one or more processors of a computing system implements a method for determining viewable screen content, said method comprising:

receiving, by a central authorization server from an author computer system of an author that created a presentation of a plurality of content to be presented to a plurality of participants who are participating in an online meeting in which the presentation is being presented, a communication to register each content, each participant being an employee of an organization, each participant having access to, and being at, a respective participant computer system, an assistant to the author being one of the participants;

in response to receiving the communication to register each content, registering, by the central authorization server, each content as a private resource;

after said registering each content, assigning, by the central authorization server, a unique identification code to each content;

receiving, by the central authorization server from the author computer system, a viewing requirement for each content to determine whether each content may be viewed on a screen of a participant computer system of each participant, said viewing requirement for each content being dependent on an employee status of rank, level, or group within the organization, said viewing requirement for each content not allowing each content to be viewed on the screen of the participant computer system of the assistant to the author;

storing, by the central authorization server in a data repository in the central authorization server, the unique identification code assigned to each content and the viewing requirement for each content;

receiving, by a screen sharing application computer system from the participant computer system of the assistant to the author, the plurality of content;

sending, by the screen sharing application computer system to the participant computer system of each participant, the plurality of content;

after each participant computer system has received each content from the screen sharing application computer system, receiving, by the central authorization server from each participant computer system, a request to determine whether the participant at each participant computer system has access to view each content, said request received from each participant computer system including the employee status of the participant at each computer system;

after said receiving the request from each participant computer system, generating, by the central authorization server, a display/block indication to either display or block each content at each participant computer system, said generating the display/block indication based on the viewing requirement for each content and the employee status of the participant of each computer system; and sending, by the central authorization server to each participant computer system, each display/block indication, which enables a screen sharing application at each participant computer system to either display or block each content on the screen of each participant computer system in accordance with each display/block indication, wherein the central authorization server, each participant computer system including the participant computer system of the assistant to the author, the author computer system of the author, and the screen sharing application computer system are different computer systems.

12. The computer program product of claim 11, wherein a first content of the plurality of content is displayed, and a second content of the plurality of content is blocked, in the screen displayed to one participant of the plurality of participants.

13. The computer program product of claim 11, wherein a first content of the plurality of content is displayed, and both a second content and a third content of the plurality of content is blocked, in the screen displayed to one participant of the plurality of participants.

14. The computer program product of claim 11, wherein each content of the plurality of content is displayed in the screen displayed to one participant of the plurality of participants.

15. The computer program product of claim 11, wherein each content of the plurality of content is blocked in the screen displayed to one or more participants of the plurality of participants, and wherein the one or more participants include the assistant to the author.

* * * * *